United States Patent [19]

Phelan et al.

[11] Patent Number: 5,572,953
[45] Date of Patent: Nov. 12, 1996

[54] ANIMAL TOTE

[75] Inventors: Richard S. Phelan, Germantown, N.Y.; Barry Jamison, Fairfield, Ohio

[73] Assignee: Taconic Farms, Inc., Germantown, N.Y.

[21] Appl. No.: 432,856

[22] Filed: May 2, 1995

[51] Int. Cl.[6] ........................................... A01K 1/03
[52] U.S. Cl. ................................. 119/496; 119/419
[58] Field of Search ............................ 119/417, 419, 119/496, 497

[56] References Cited

U.S. PATENT DOCUMENTS

| | | |
|---|---|---|
| 2,988,044 | 11/1958 | Adelberg et al. . |
| 3,537,428 | 11/1970 | Montgomery ........................... 119/419 |
| 3,654,534 | 4/1972 | Fischer ................... 119/419 X |
| 4,130,088 | 12/1978 | Salvia . |
| 4,640,228 | 2/1987 | Sedlacek et al. .............. 119/419 |
| 4,907,536 | 3/1990 | Chrisler ................................. 119/419 |
| 5,000,120 | 3/1991 | Coiro, Sr. et al. ..................... 119/419 |
| 5,044,316 | 9/1991 | Thomas ................................. 119/419 |
| 5,174,241 | 12/1992 | Goguen et al. . |

FOREIGN PATENT DOCUMENTS 2580-463  10/1986  France .

*Primary Examiner*—Robert P. Swiatek
*Attorney, Agent, or Firm*—Fay, Sharpe, Beall, Fagan, Minnich & McKee

[57] ABSTRACT

A tote for transporting animals has a container, each having a unitary injection molded design. The interior of the container is provided with dividers to provide separate compartments for containing animals therein. The sides and lid of the tote have arrays of minute holes that provide air flow into the container, and filter material is provided to cover the air holes so that contaminated air is prevented from reaching the animals container therein. The filter material is held in place by filter frames provides for the lid and side walls of the tote. A water container is also provided in the container for providing a supply of water that is accessible to the animals.

12 Claims, 16 Drawing Sheets

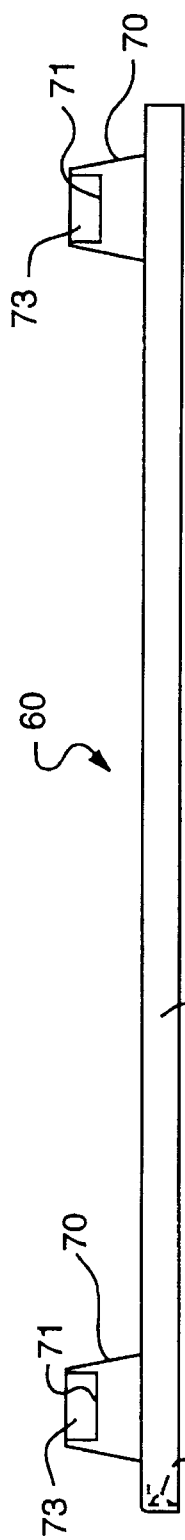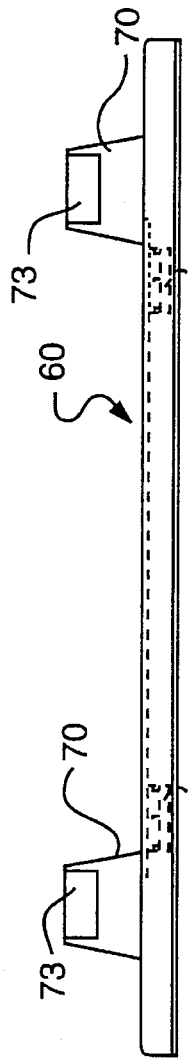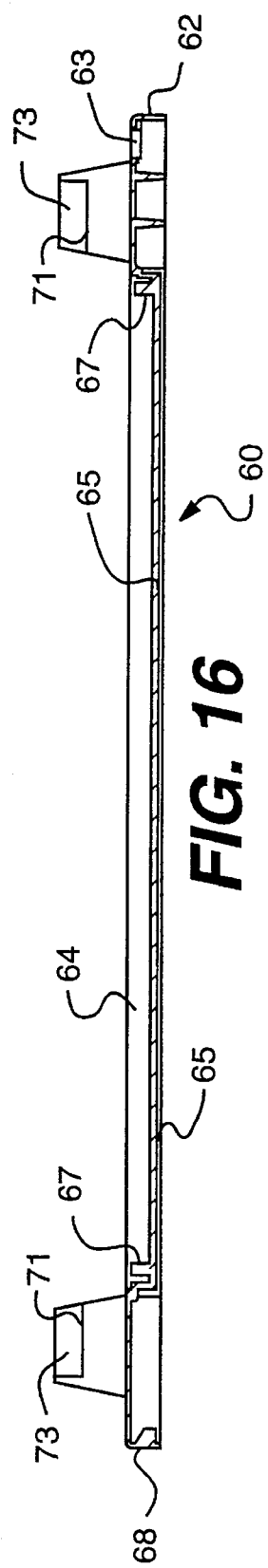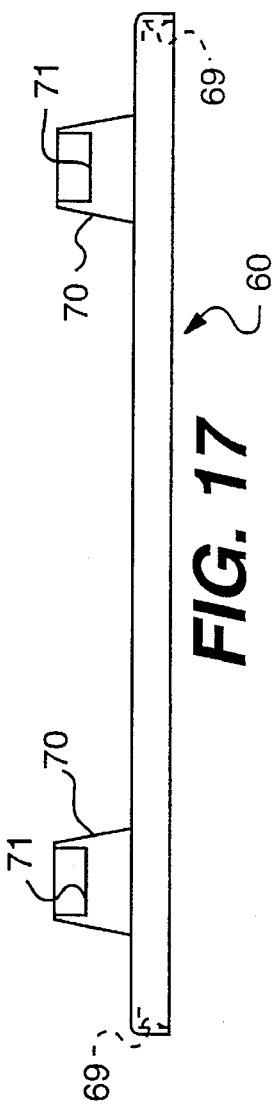
FIG. 14
FIG. 15
FIG. 16
FIG. 17

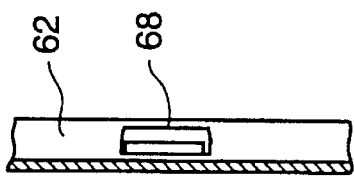
FIG. 25
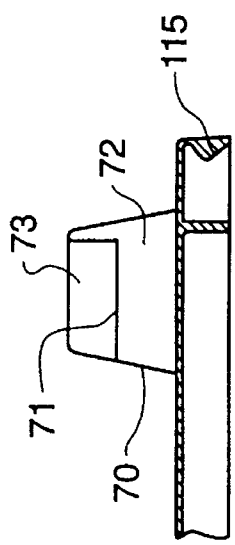
FIG. 23
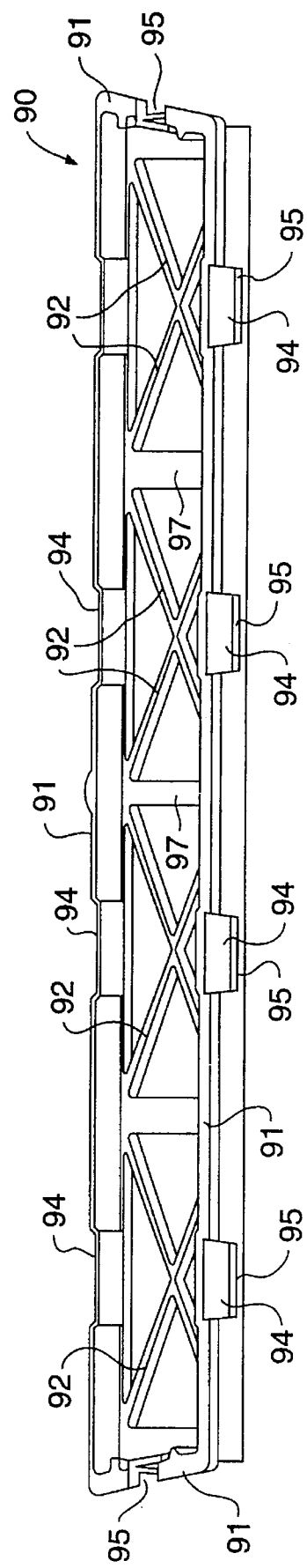
FIG. 24
FIG. 26

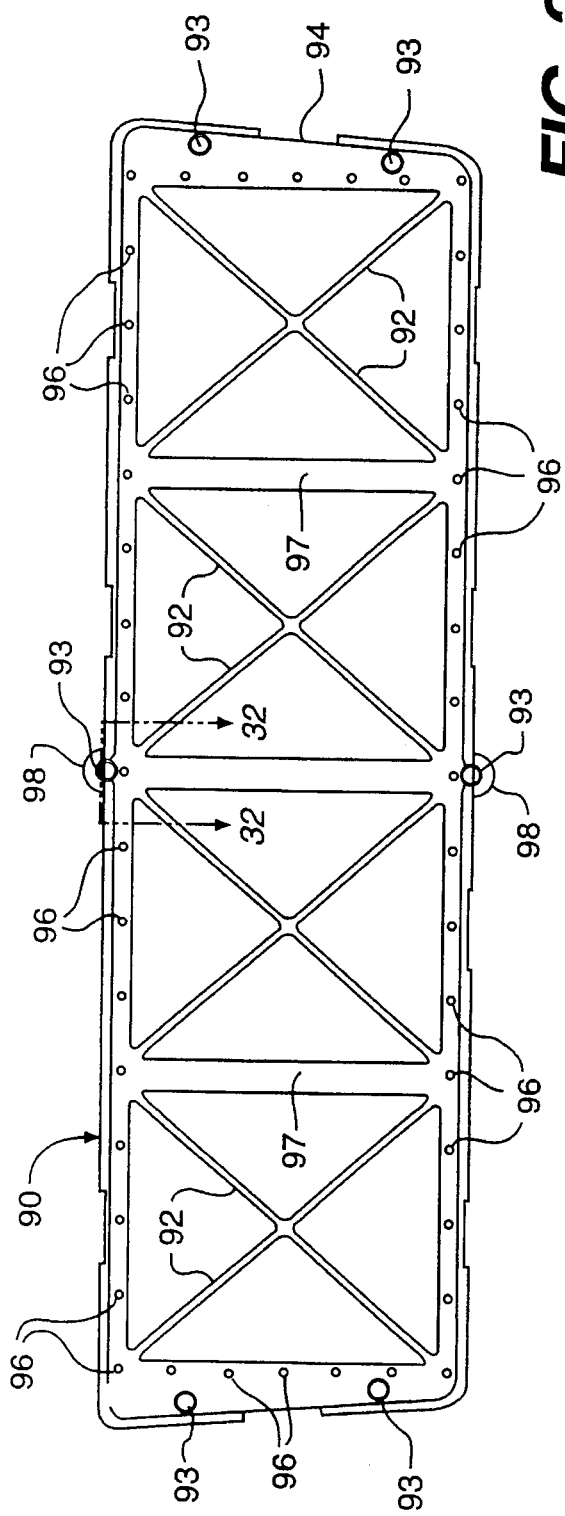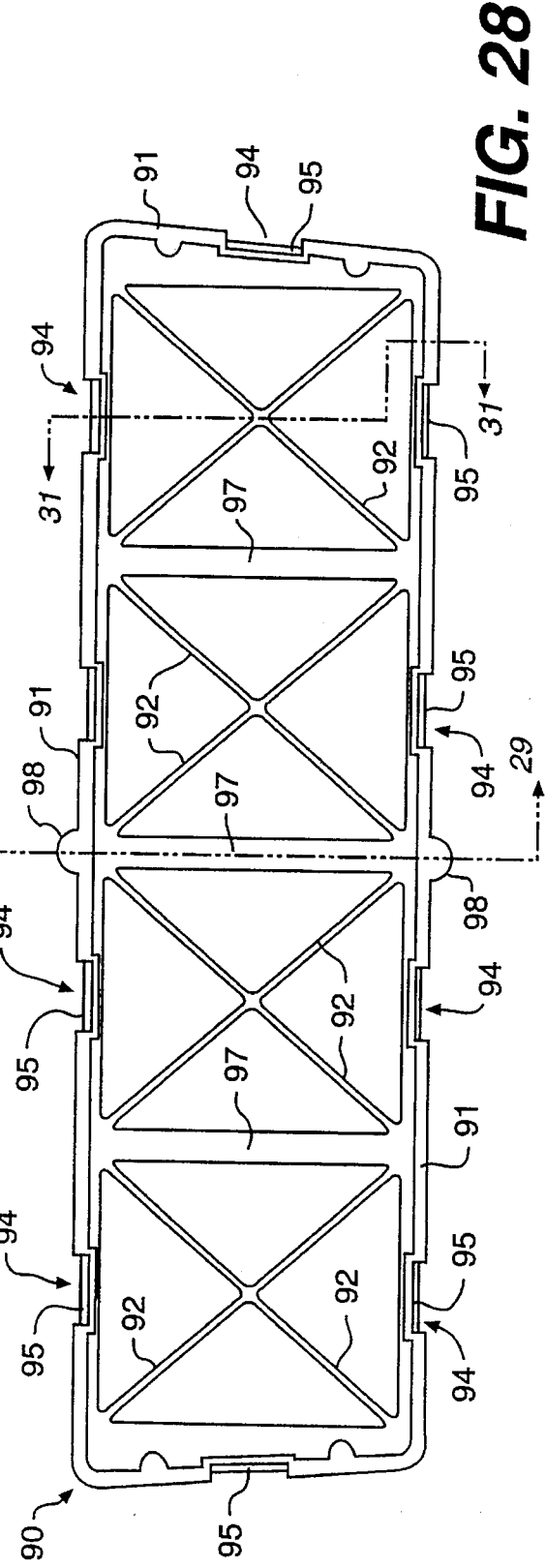

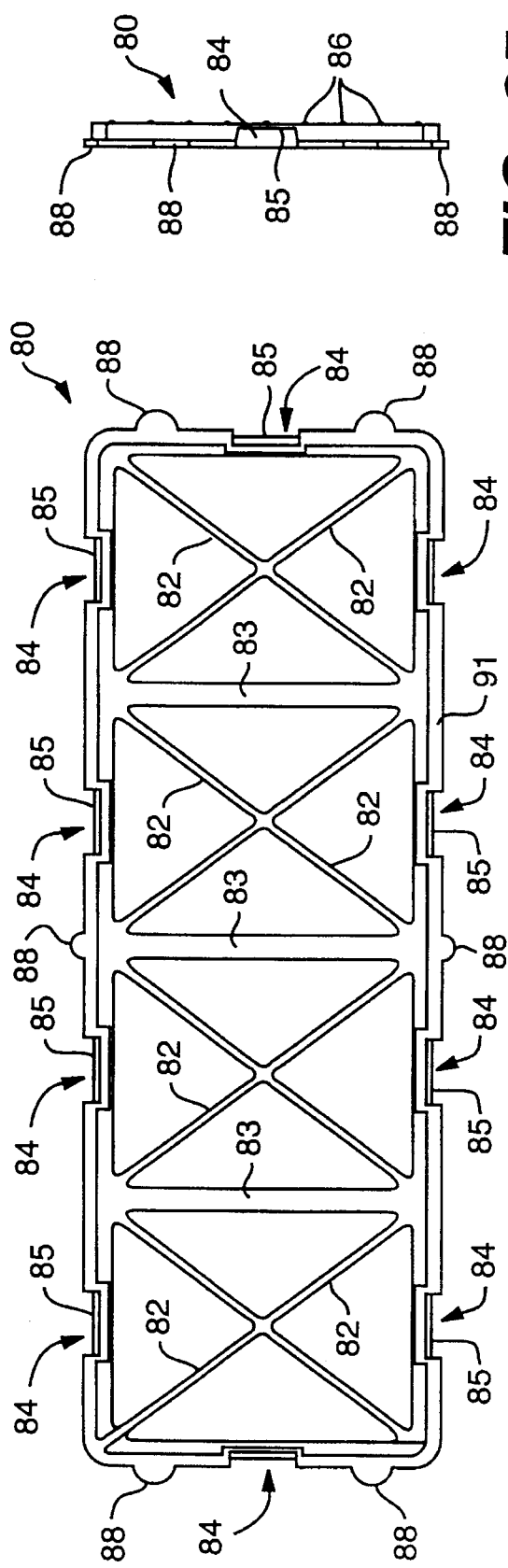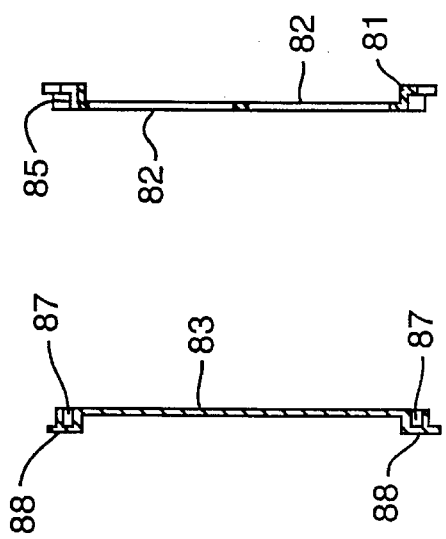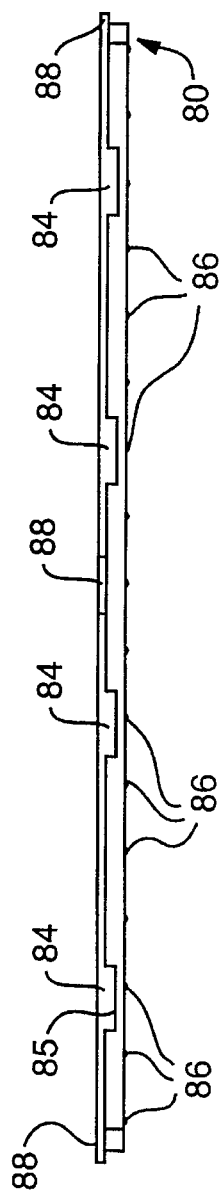

ically in FIG. 1.

ANIMAL TOTE

FIELD OF THE INVENTION

The invention relates to a container or tote for holding and transporting animals, particularly small animals. Once the lid is closed, the animals are substantially protected from exposure to airborne contaminates by filtering the outside air that is permitted to enter the container.

BACKGROUND OF THE INVENTION

Conventional animal totes are constructed of cardboard and provided with air passages that ventilate the interior of the container to permit the animals to breath. To prevent contaminated air from entering the container, the air passages are covered with a filter material. Since small animals, such as laboratory rats, are capable of gnawing or chewing through a variety of materials, the filter material cannot be directly exposed to the interior of the container, otherwise the animals might eat the filter material, thereby destroying the contamination prevention that the filter material provides.

It is important in the transportation of certain animals to minimize the risk of contamination of the interior of the container with unfiltered air.

To cover the air passages with filter material in the conventional type of cardboard container constructions, first a sheet of wire mesh is placed across the opening of the container. Then, a layer of filter material, such as a woven or spun filter material, is placed over the mesh to cover the opening. This results in a construction wherein the animal contained within the tote is required to chew through the wire mesh before it can reach the filter material. Since wire mesh is difficult to chew through, the filter materials remains intact so that adequate contamination prevention is provided.

In the conventional construction, however, the application of the wire mesh and filter layers across the openings of the container is required to be performed manually, thereby increasing the amount of manual labor required to assemble the containers. To decrease the assembly time, the wire mesh and filter layers are frequently fastened to the exterior of the container by using staples or similar fasteners. Although this increases the efficiency of container assembly, it makes it difficult to change the filter material when the container is reused. Further, since the overall construction of the container is of a cardboard like material, the container can only be reused a limited number of times and then must be discarded.

SUMMARY OF THE INVENTION

It is an object of the invention to provide a stackable molded plastic animal tote that has air passages adapted to be covered with a filter material for preventing unfiltered air from reaching the interior of the container. In particular, it is an object to provide air passages that includes an array of minute holes that provide airflow to the interior of the container while preventing the animals contained therein from chewing through the air passageways.

It is a further object of the invention to provide a container with air passages that are covered with a filter material that is secured in place by a snap-on grid so that the filter material is easily installed and replaced. The grid has webs forming a lattice that covers the filter material without substantially blocking the flow of air through the filter material and the air passages. By providing air passages that have a sufficient density of minute air holes, air can flow into the container through the filter material for sustaining the life of the animals, even when the containers are stacked.

It is a further object of the invention to provide a lid for an animal tote container that has a return flange extending over the rim of the container to form a joint having a tortuous air flow passage between the container and lid for preventing the direct flow of air into the container.

It is yet another object of the invention to provide a container having dividers disposed within the container to separate the interior thereof into separate compartments, each for housing one animal. Further, the interior of the container can be provided with a water dispenser for providing drinking water for the animals.

It is yet another object of the invention to provide a tote having stacking flanges on the top of the tote lid for receiving the bottom wall of an adjacent stack tote so that the bottom wall does not contact the lid of the adjacent tote preventing air from flowing through the air passages in the lid. Further, the side and end walls of the container are preferably provided to slope inwardly to maintain an adequate sidewall to sidewall separation between side-by-side arranged totes that permits airflow into the container through the sidewalls.

BRIEF DESCRIPTION OF THE DRAWINGS

FIG. 14 is a side elevation view of the lid shown in FIG. 13.

FIG. 15 is an end elevation view of the lid shown in FIG. 13.

FIG. 16 is a cross sectional view of the lid shown in FIG. 13, taken along lines 16—16 thereof.

FIG. 17 is an end view opposite to the view shown in FIG. 15 of the lid shown in FIG. 13.

FIGS. 19–25 are cross sectional views of the lid shown in FIG. 18, respectively taken along lines 19—19, 20—20, 21—21, 22—22, 23—23, 24—24, and 25—25 thereof.

FIG. 26 is a perspective view of a filter frame for the container shown in FIG. 1.

FIGS. 27 and 28 are opposite side plan views of the filter frame shown in FIG. 26.

FIG. 33 is a plan view of the filter frame for the lid shown in FIG. 2.

FIG. 34 is a side elevation and FIG. 35 an end elevation of the filter frame shown in FIG. 33.

FIGS. 37 and 38 are cross sectional views of the filter frame taken along lines 37—37 and 38—38, in FIG. 36, respectively.

DETAILED DESCRIPTION OF THE PREFERRED EMBODIMENTS

The animal tote 1 of the invention, according to a preferred embodiment thereof, is shown in FIGS. 1 through 5, and includes a container 10 and lid 60. Each is molded separately of hi-flow medium impact polypropylene by injection molding to provide a unitary molded construction that can be repeatedly cleaned and reused in the transporting of animals.

Figure 44:
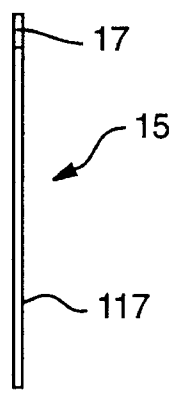
Figure 45:
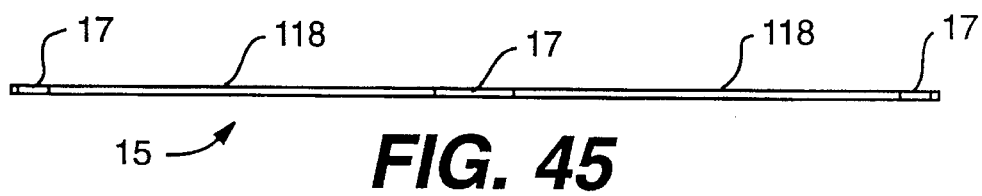

Specifically, container 10 has a bottom wall 11, opposed side walls 20 and 30, and opposed end walls 40 and 50 forming an open top container of a unitary, molded design. The interior of the tote 1 is divided into compartments by dividers 15, shown generally in FIG. 5 and in detail in FIGS. 43–45. Additionally, the container is adapted to receive a water container 12, shown generally in FIG. 3 and in FIGS. 39–42 in detail. A flexible water bag can be inserted into container 12 for dispensing water therefrom. Additional food and water can be provided for the animals in the form of tablets or separate water and food providing containers, not shown.

Figure 1:
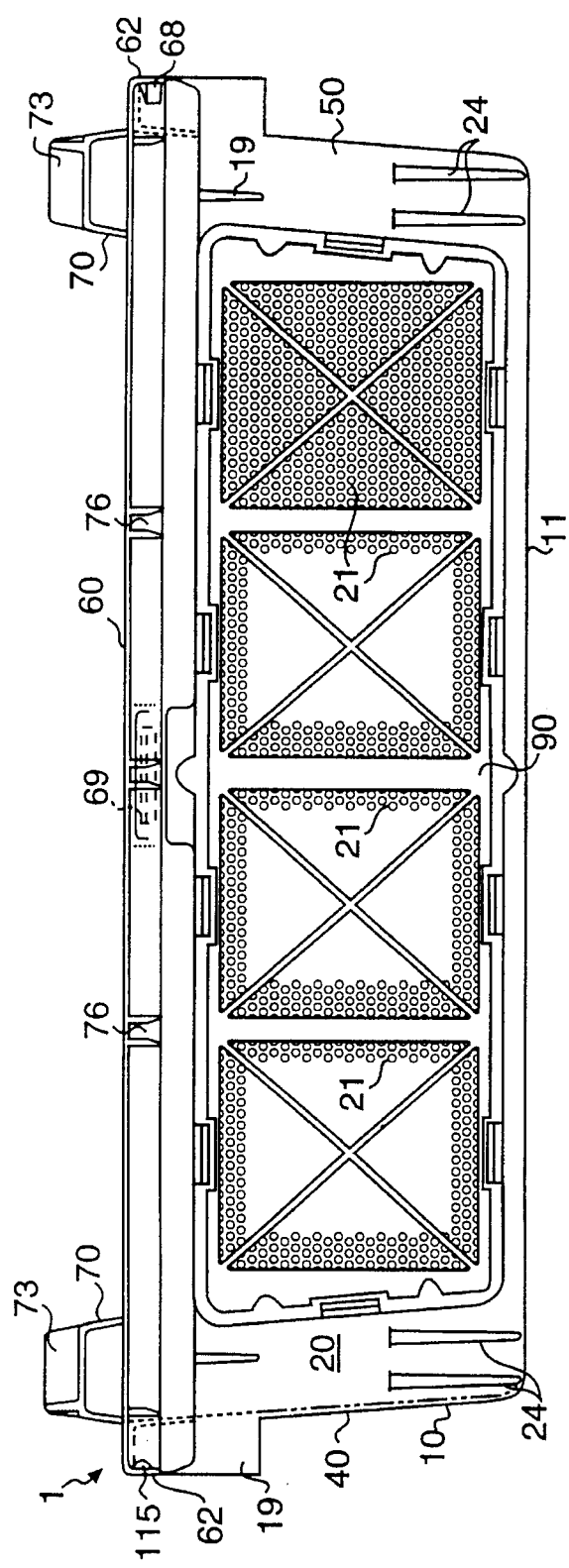
FIG. 1 is a side elevation of the animal tote of the invention.
Figure 2:
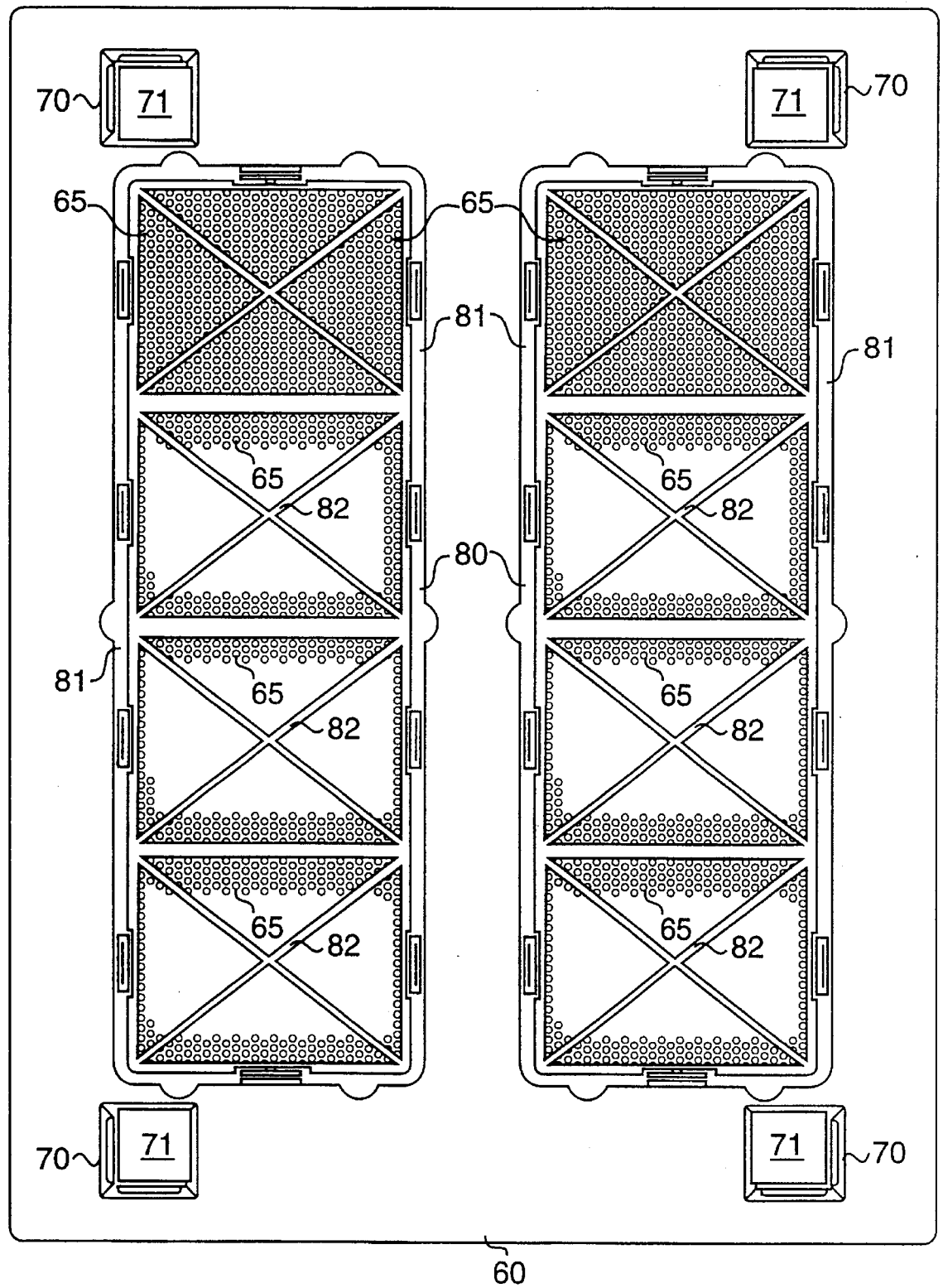
FIG. 2 is a top view of the animal tote shown in FIG. 1.
Figure 4:
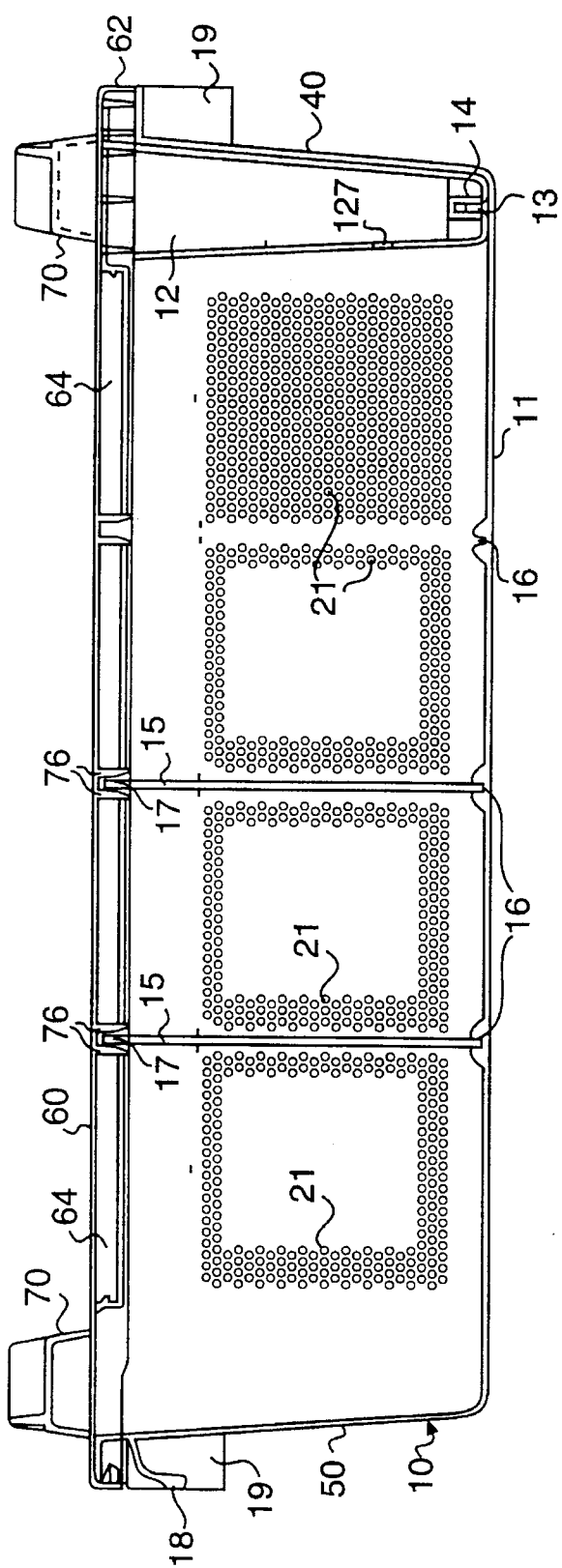
FIG. 4 is a side elevation of the animal tote of FIG. 1 with the side wall omitted to show interior details thereof.
Figure 5:
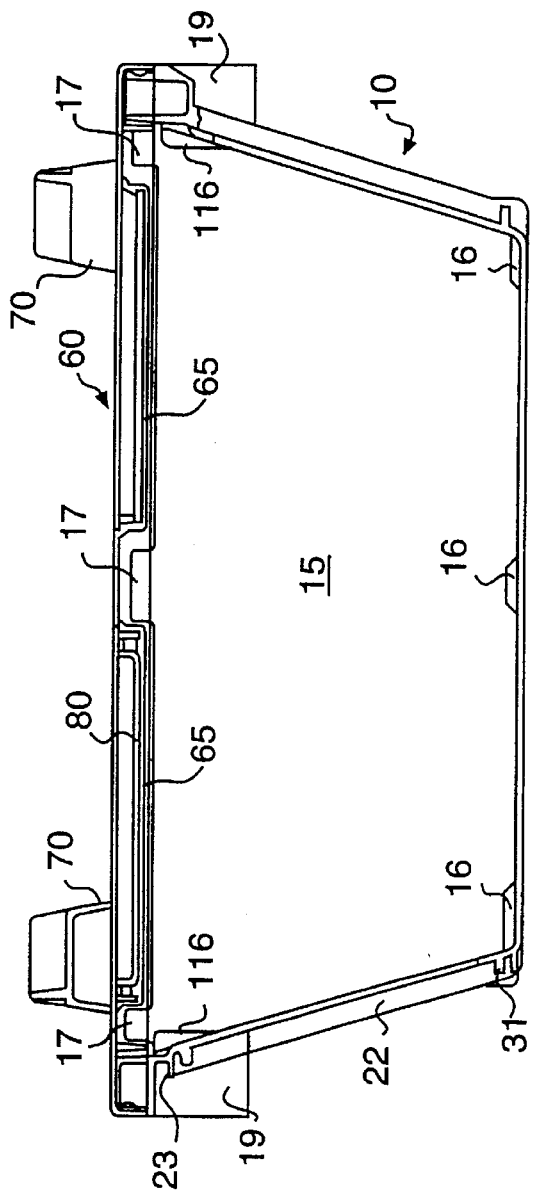
FIG. 5 is an end view of the animal tote of FIG. 1 opposite to the end view shown in FIG. 3.

To provide ventilation within the container, the side walls 20 and 30 of container 10 are provided with several arrays of minute holes 21, as shown in FIGS. 1 and 4, for example. Further, as shown in FIG. 2, the lid is provided with arrays of minute holes 65 through which air can enter into the container. In order to mold the lid and container with a sufficient density of the minute holes, each having a nominal diameter of 0.080 inch and a center point to center point separation distance of 0.160 inch, the plastic material must have a high flow rate, and according to the preferred embodiment of the invention, hi-flow medium impact polypropylene is used for this purpose. Since it is an object of the invention to prevent contaminated air from entering the interior of the container, the arrays of minute holes 21 and 65 are respectively covered with a filter material, not shown, that is held in contact with the holes by container filter frames 90 and lid filter frames 80, as shown in FIG. 1 and 2, and described in greater detail hereinafter.

Lid 60 is provided with a return flange 62 that fits around the periphery of the container to create a treacherous air flow passage therebetween for which no specific seal structure is provided between the lid and container. However, the close fitting structure that is provided, as discussed in greater detail herein, provides an obstructed air passage that prevents unfiltered air from entering the interior of the container. For example, any dirt or contaminated particles that would tend to flow into the container through the seal between the lid and container would adhere to the edges of the container or lid before entering the container. This helps to keep the interior of the container uncontaminated and the animals protected as a result.

Figure 3:
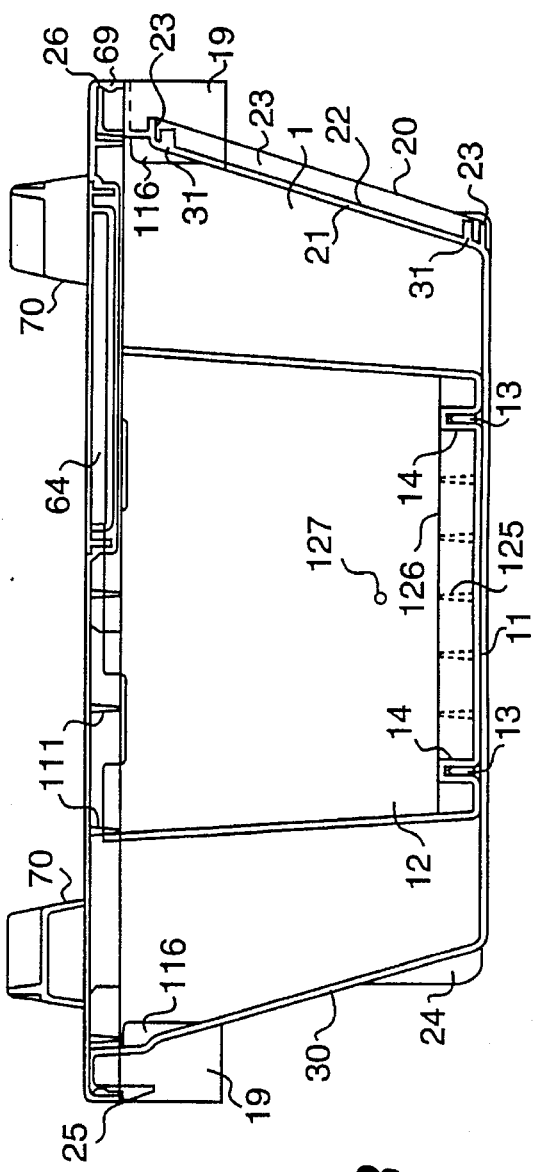
FIG. 3 is an end view of the animal tote shown in FIG. 1 with the end wall omitted to show greater detail.
Figure 6:
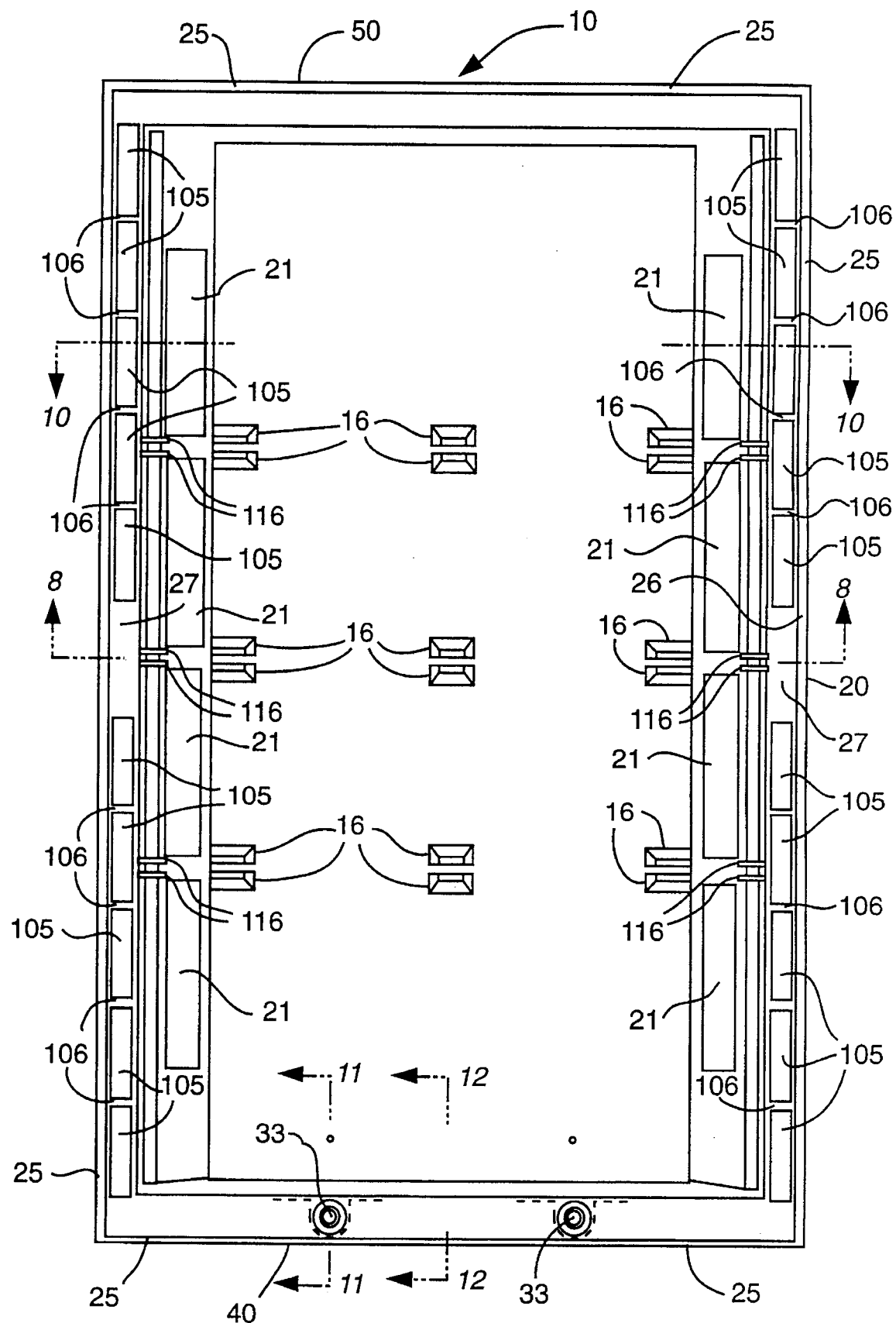
FIG. 6 is a top plan view of the container for the animal tote shown in FIG. 1.
Figure 40:
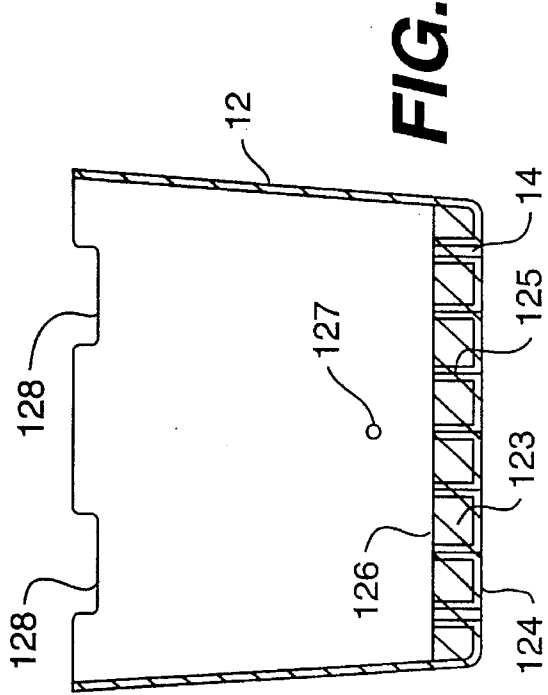
FIGS. 40 and 41 are cross sectional views taken along lines 40—40 and 41—41 in FIG. 39.
Figure 42:
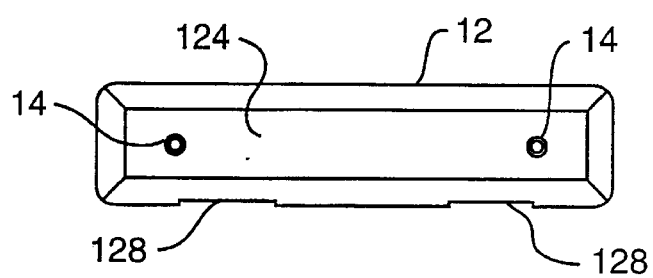
FIG. 42 is a bottom view of the water bottle shown in FIG. 39.
Figure 43:
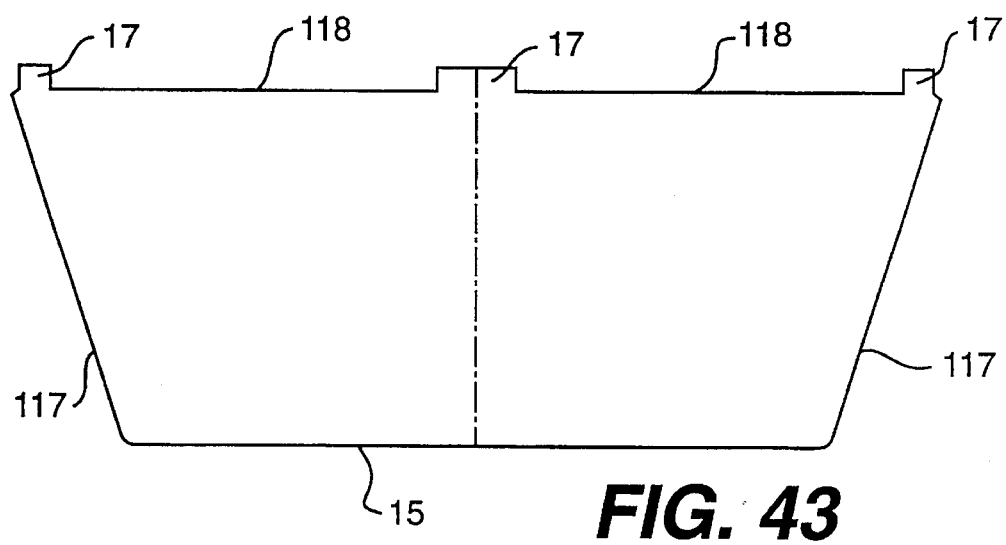
FIG. 43 is an elevation view of the divider for the animal tote shown in FIG. 5, and FIGS. 44 and 45 are side and top views thereof, respectively.

FIGS. 1 through 5 show the details of the tote, which includes the container 10, lid 60, dividers 15, water container 12 and filter frames, according to a preferred embodiment. FIGS. 6–12 show details of just the container 10. FIG. 6 is a top view of container 10 with the water bottle 12 and dividers 15 removed therefrom. Water bottle 12 is held in place along bottom wall 11 of the container by posts 13, as shown in FIGS. 3 and 4, which engage sockets 14 in the bottom of the container as shown in FIGS. 40 and 42. To hold the dividers in place, slots are formed between flanges 16 along bottom wall 11, as shown in FIGS. 4–6, 8 and 10. Further, these figures show additional flanges 116 formed along the side walls 20 and 30 which also form slots therebetween for holding the dividers. The dividers are provided with sloping wall portions 117, as shown in FIG. 43, that match the slope of the side walls so that there are no gaps between the edges of the dividers and the side walls. Along the top edge 118 of the dividers are tabs 17, as also shown in FIG. 43, that engage in slot 76 formed between flanges and the underside of lid 60, as shown in FIGS. 4–6 and 18. Once lid 60 is fit into the closed position on container 10, the dividers 15 are securely held in place by the flanges 16 along the bottom wall of the container, the flanges 116 along the side walls of the container and the engagement of tabs 17 between the flanges 76 on the underneath side of the lid. This ensures that the dividers 15 are maintained in place when a plurality of animals are transported in the tote.

Figure 8:
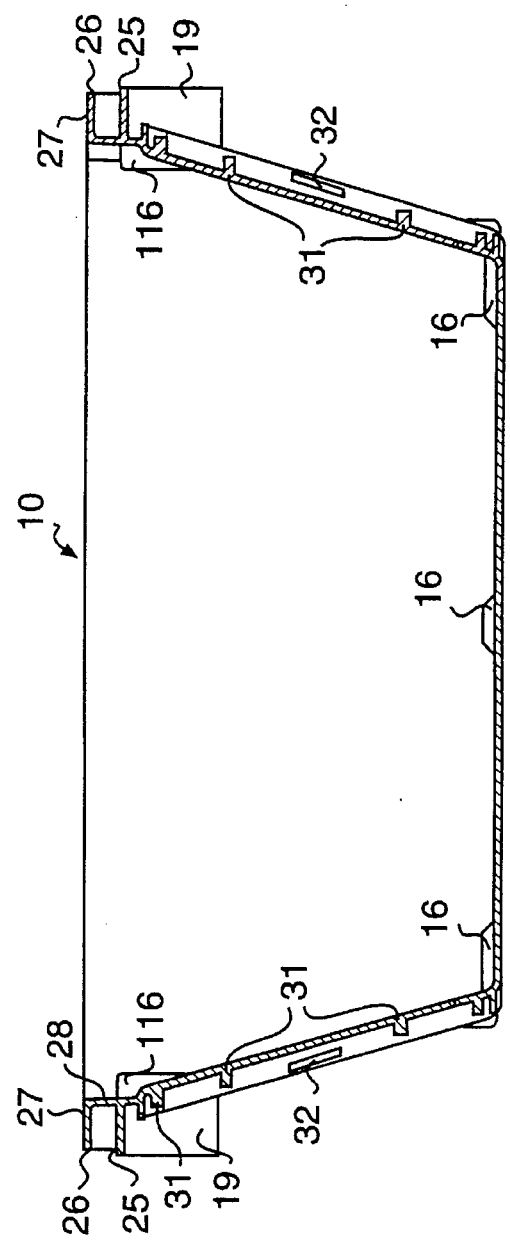
FIG. 8 is a cross sectional view of the container of FIG. 6 taken along lines 8—8 shown in FIG. 6.
Figure 9:
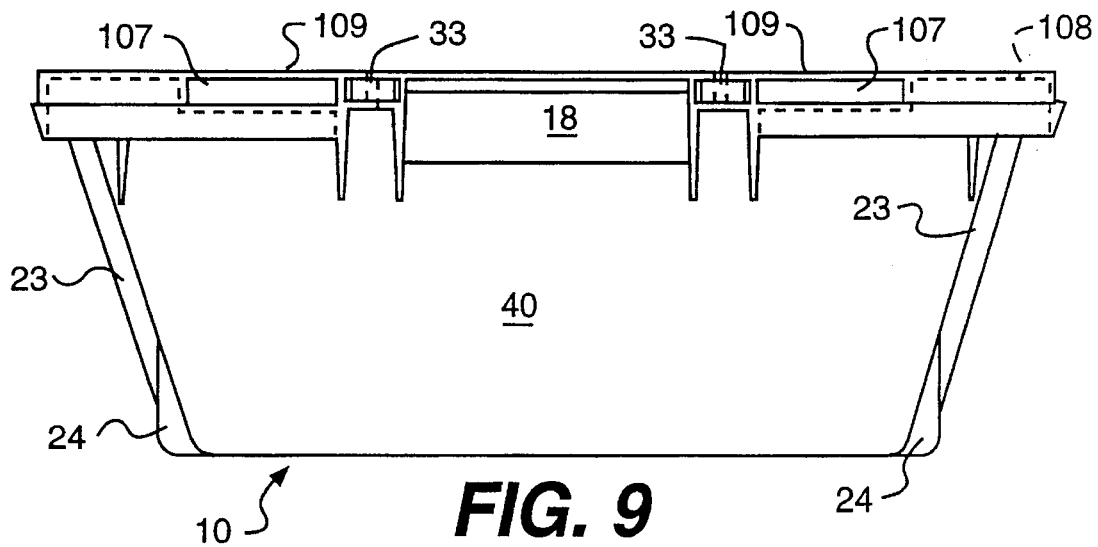
FIG. 9 is an end view of the container of FIG. 6.
Figure 10:
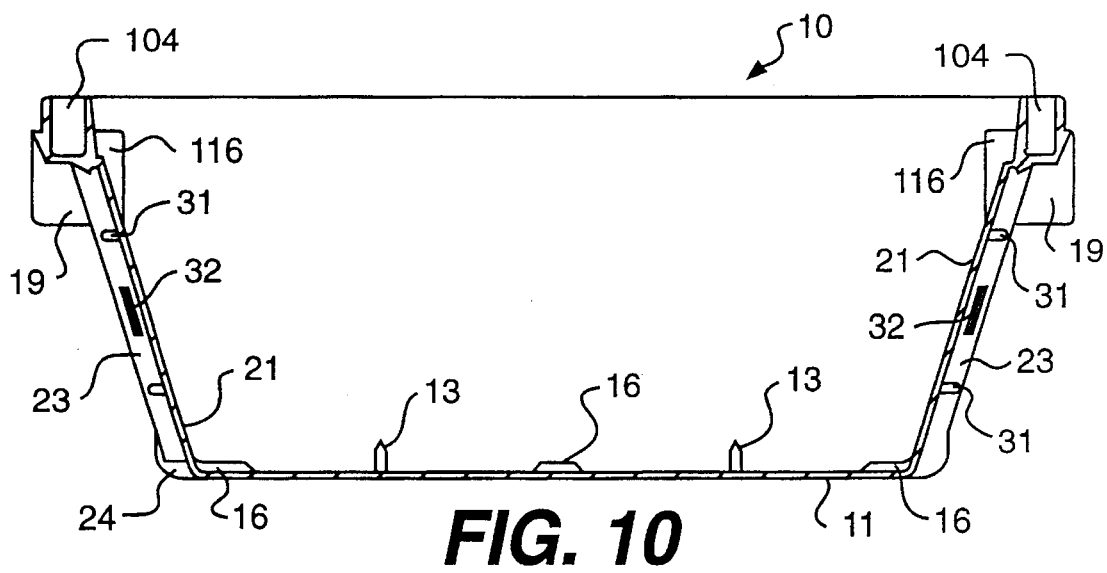
FIG. 10 is a cross sectional view of the container of FIG. 6 taken along lines 10—10 shown in FIG. 6.
Figure 11:
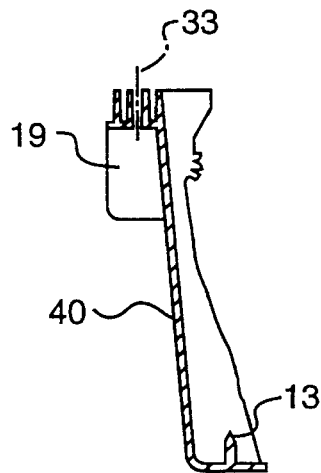
FIGS. 11 and 12 are cross sectional views of the container shown in FIG. 6, respectively taken along lines 11—11 and 12—12 thereof.
Figure 12:
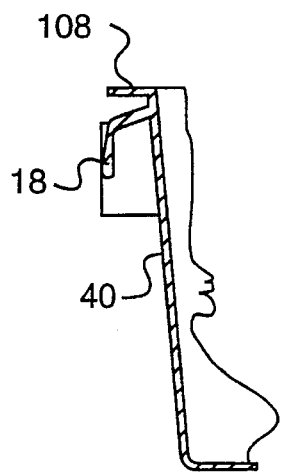

To facilitate handling of the container, hand holds 18, one of which is shown in FIGS. 4 and 12, are provided in the end walls 40 and 50 of the container. Further, the side and end walls are sloped inwardly toward bottom wall 11 from the open top of the container to permit nesting of the containers when the lids are not in place. Flanges 19 located around the periphery of the container function as nesting stops when the containers are nested together in a vertical stack. Further, side walls 20 and 30 are sloped inwardly to a greater extent than is required for nesting, as shown in FIGS. 8–10, for example, to provide, in combination with flanges 19, sufficient separation distance between adjacent totes when adjacent totes are placed side by side, either individually or in stacks. Side by side separation is maintained to ensure adequate ventilation between adjacent containers, for the health of the animals.

FIGS. 3 and 8, and FIG. 10 in particular, show that each of side walls 20 and 30 has a recess 22 in which the corresponding side filter frames 90 are received, and in which the arrays of minute holes 21 are formed. A filter material, not shown, which is preferably a self adhesive filter material, having a shape of the recesses 22 is placed over the arrays of minute holes 21 to filter the air passing through the minute holes and into the containers through the side walls thereof. The filter frames, to be described in greater detail hereinafter, are sized to have an outer peripheral frame portion that fits tightly within the corresponding recesses to keep the filter material pressed against the array of minute holes for preventing the arrays of minute holes 21 from receiving unfiltered air.

Figure 18:
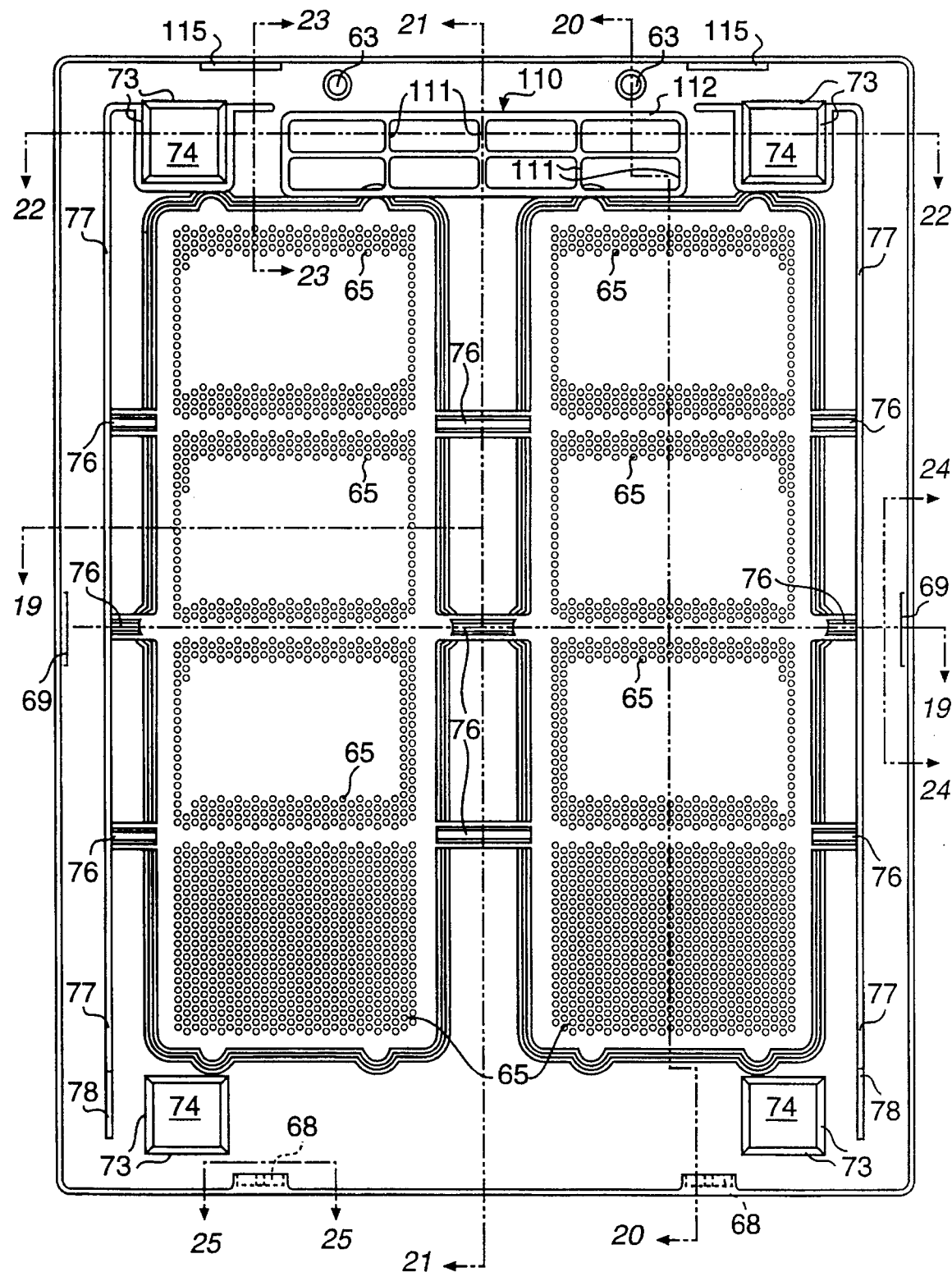
FIG. 18 is a bottom plan view of the lid shown in FIG. 13.
Figure 19:
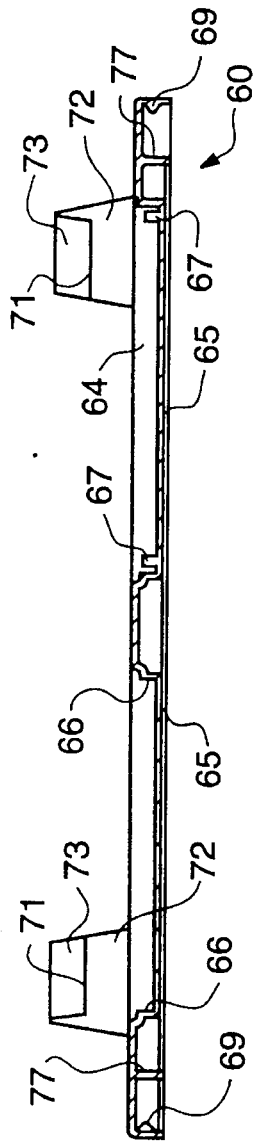

When the totes are stacked in a vertical stack with the lids on, a separation distance between the top of one lid and the bottom wall of an adjacent stacked container is maintained by stacking posts 70 that are formed in lid 60 and extend above a planar portion 61 of lid 60, as shown in FIGS. 1–5, and in greater detail in FIGS. 13–23. As shown in FIG. 18, the posts 70 have open bottom 74 from which the mold core is inserted during molding of the container. As shown in FIGS. 1 and 2, container 10 has corner flanges 24 that extend out from the lowermost portion of the inwardly sloping side walls 20 and 30, along bottom wall 11 to provide a structure that is received between inwardly facing corner flanges 73, as shown in FIG. 23. The bottom wall 11 and corner flanges 24 are supported by a horizontal support surface 71 of the stacking posts 70. The height above which a bottom wall 11 is supported above the planar portion 61 of the lid 60 is determined by the dimension of the base 72 of the stacking post 70, as shown in FIG. 19, for example. The preferred separation height or distance is determined in accordance with the objective to enable air to freely flow into the container through the arrays of minute holes 65 formed in the lid 60.

Figure 7:
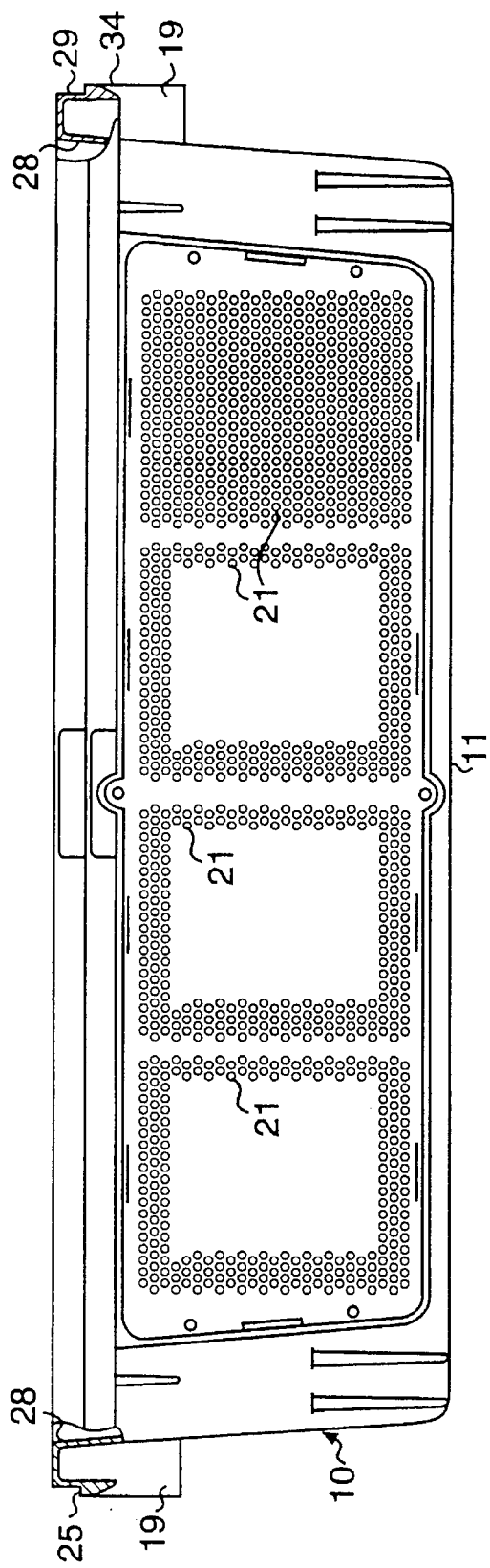
FIG. 7 is a side elevation, partly in section, of the container shown in FIG. 6.

For providing an obstructed air flow passage through the joint formed between lid 60 and container 10, return flange 62 has a downwardly facing edge that engages a lip or narrow horizontal peripheral portion 25 that extends around the periphery of the container, as shown in FIG. 6. Further, the inner surface of return flange 62 engages an outer peripheral surface 29, as shown in FIG. 7, for example, of the container to form the separate air flow passage between the lid and container, discussed above. As shown in FIG. 7, an exterior side face 34 formed around the periphery of the container is also provided just below lip 25. After the lid has been closed on the container, a piece of adhesive tape is preferably used to overlap the joint formed between the return flange and exterior side face 34 to form an exterior seal therebetween. By using adhesive tape in this manner, in combination with providing a separate air flow passage structure, the potential for contamination within the container caused by air flow through the joint formed between the lid and container is minimized.

Figure 13:
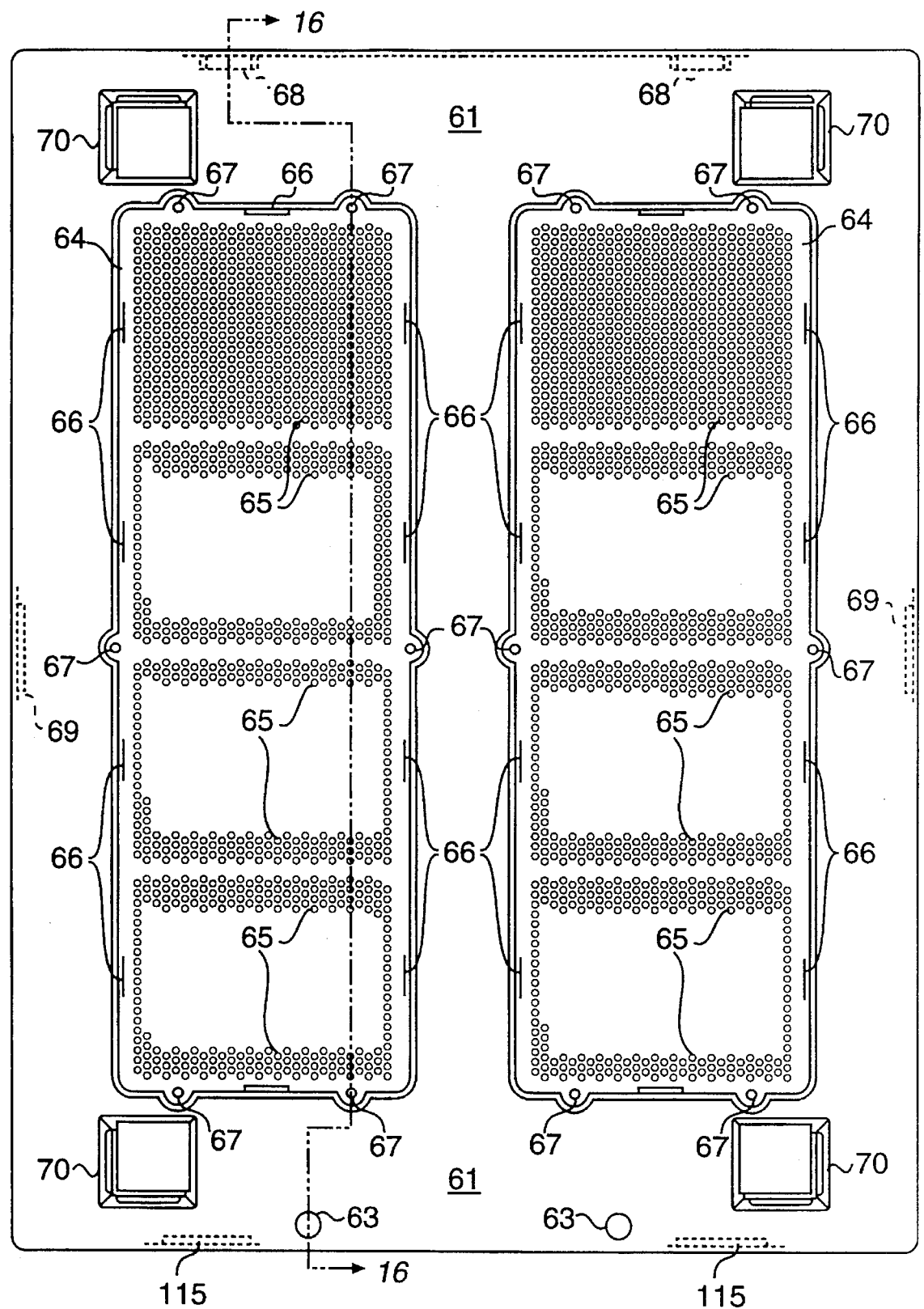
FIG. 13 is a top plan view of the lid of the animal tote shown in FIG. 1.

As shown in FIG. 6, in the top view of the container, the periphery of the container is constructed with a plurality of cells 105 that are open facing upwardly and that have webs 106 extending therebetween. This open cell structure provides the container with a strong periphery that is relatively wide, thereby providing a structure that contributes to the design of the treacherous air flow passage between the lid and container. Between the inner most cells 105 along the mid portion of the side walls, a top flange 27 is formed that has a terminal edge portion 26, as shown in FIGS. 6 and 8. Edge portion 26 of flanges 27 is provided to be engaged by a snap fitting flange 69 correspondingly formed along the sides of the lid, as shown in FIGS. 13 and 18, and in particular as shown in FIG. 3. This snap fit construction along the sides of the tote between the lid and container is provided to ensure that the lid is maintained in the closed position during transportation of the tote.

Similarly, snap lock flanges are provided along the ends of the lid, as shown in FIG. 13 and 18, and in particular in FIG. 1 wherein snap lock flanges 68 and 115 are shown to be in engagement with an edge of the periphery of the container formed along the end walls of the container. As shown in FIG. 9, the end walls have cells 107 that open outwardly and that have a top flange portion 109 which provides the edge over which the snap fit flanges 68 and 115 extend (only the structure for end wall 40 is shown in FIG. 9, it being understood that a similar structure is provided for end wall 50).

Figure 20:
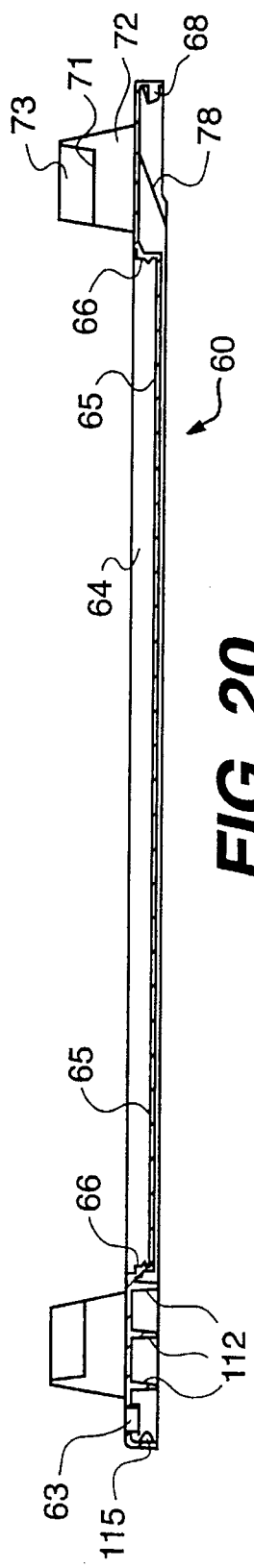
Figure 21:
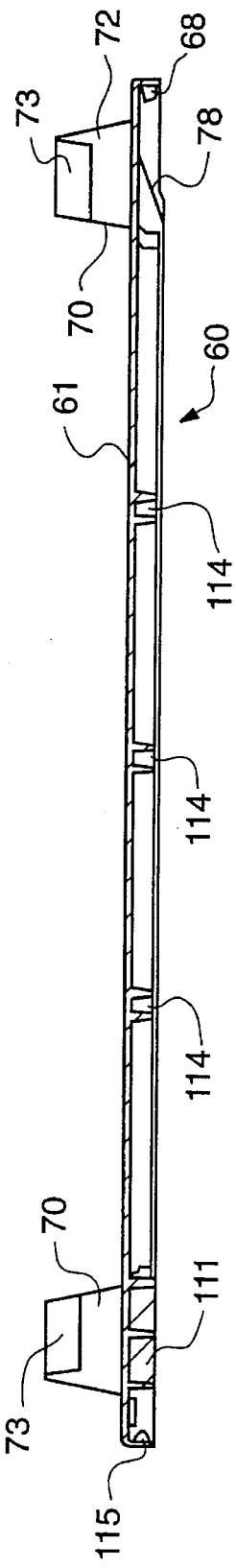

According to the preferred embodiment that is shown in the drawings, snap fit flanges 68 are formed to be slightly deeper than the corresponding structure of flanges 115 and 69. The reason for this is that, in the preferred embodiment, the flanges 68 slide underneath the corresponding edge structure provided along the rim of the container, rather than being forced down and snap fit thereover. In particular, when the lid is moved into the closed position from an initial position wherein the underside of lid 60 rests along end wall 50, flanges 77 provided along the underside of the lid 60, as shown in FIGS. 18 and 20–21, are adapted to permit relative sliding movement between the lid and the container, particularly along the end wall 50. As shown in FIGS. 20 and 21, flanges 77 have a sloping portion 78 thereof which slopes toward the underneath side of the planar portion 61 of the lid at the end thereof where snap fit flanges 68 are formed. It is intended that as the lid is moved in sliding engagement of the flanges 77 with the end wall 50, the lid will be moved into the closed position, with the snap fit flanges 68 sliding underneath the edge structure 107 provided along end wall 50. Thereafter, the snap fit flanges 69 along the sides of the lid and finally the corresponding flanges 115 along the opposite end wall will be flexed into their closed position by securing the lid onto the periphery of the container with a slight amount of force, sufficient to snap the flanges over the corresponding edge structure, as discussed above. Once the lid is in place, the lid security apertures 33 formed in end wall 40 of the container will be aligned with the security apertures 63 formed in the lid and a security tie can be passed therethrough.

Figure 22:
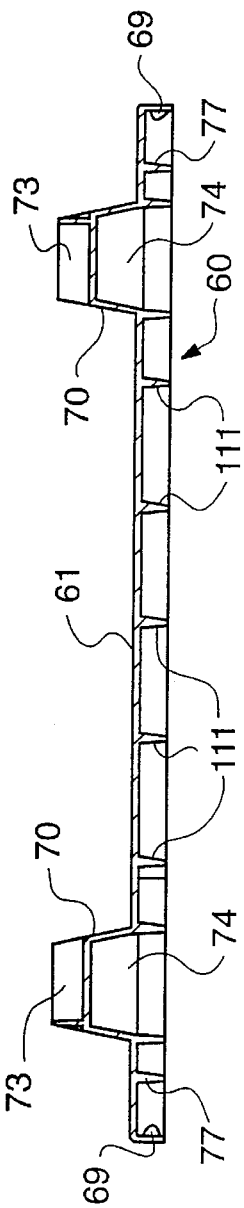
Figure 29:
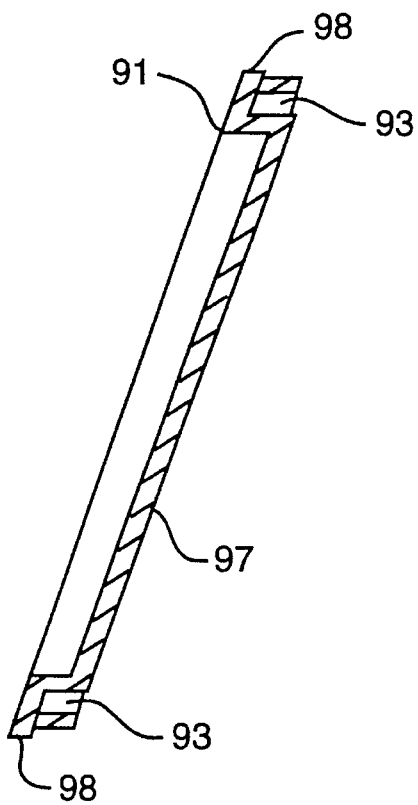
FIG. 29 is a cross sectional view of the filter frame shown in FIG. 28 taken along lines 29—29 thereof.

As discussed, water container 12 is secured in place along bottom wall 11 of the container by posts 14 and correspondingly sockets 13. With reference to FIGS. 39–42, the water container 12 has an open top 122 in which is received a box-shaped flange structure 110 provided along an underneath portion of the lid 60, as shown in FIGS. 18 and 22. The box-shaped structure includes flanges 111 and 112, which are perpendicular to each other. The box structure is dimensioned to fit closely within the open top 122 of container 12, and for this reason the container 12 has cut-out portions 128 along the top edge of the container that provide clearance for the outermost portions of the recessed area 64 of the lid. When the lid is in its closed position, additionally securing the water container is secured along its top portion thereof so that it will not tip over during transportation of animals.

Figure 39:
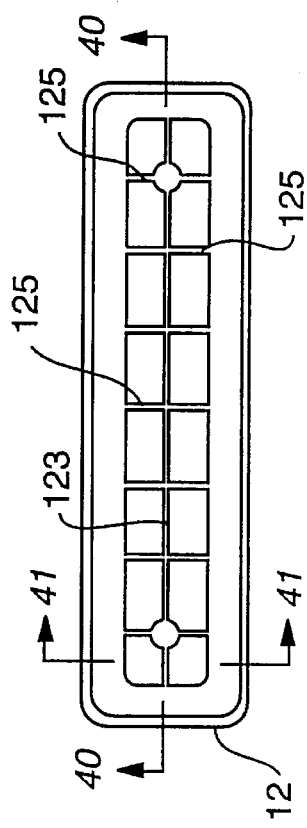
FIG. 39 is a top view of the water container for the animal tote shown in FIG. 3.
Figure 41:
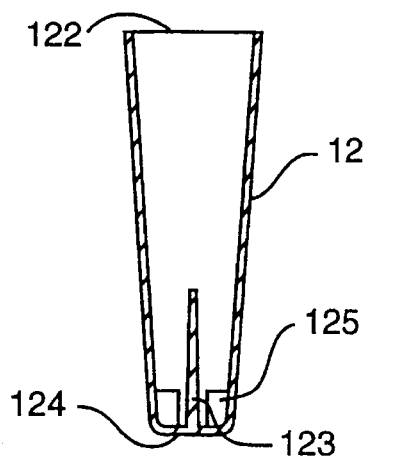

The water container 12 has a flange structure in the bottom portion of the container, as shown in FIGS. 39–41, which includes flanges 123 and 125, perpendicular thereto. The flange structure provides a raised bottom floor 126 that supports a water packet or bag into which a suitable valve is inserted through aperture 127.

As mentioned, along the side walls of the container, arrays of minute holes 21 are formed through which air enters for ventilating the compartments of the container formed by the divider 15. A filter material is spread over the holes and secured in place by side filter frames 90, shown in FIGS.

26–32. Similarly designed lid filter frames 80, shown in FIGS. 33–38 are provided to secure in place filter material covering arrays of holes 65 formed in the lid. The structure of these filter frames is described in greater detail, as follows.

Figure 30:
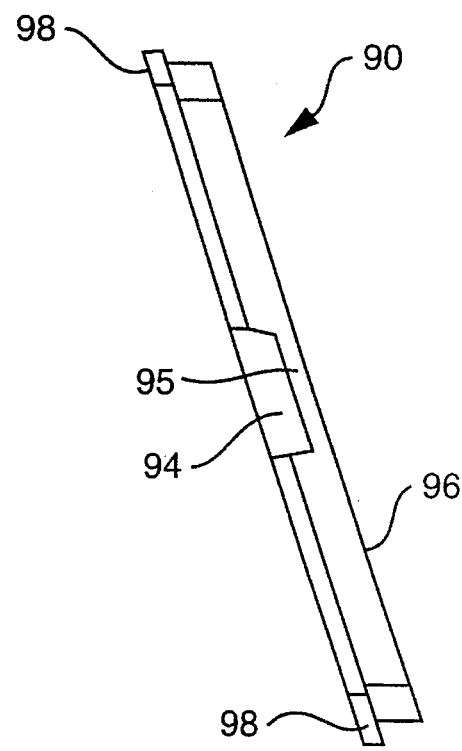
FIG. 30 is an end view of the filter frame shown in FIGS. 27 and 28.
Figure 31:
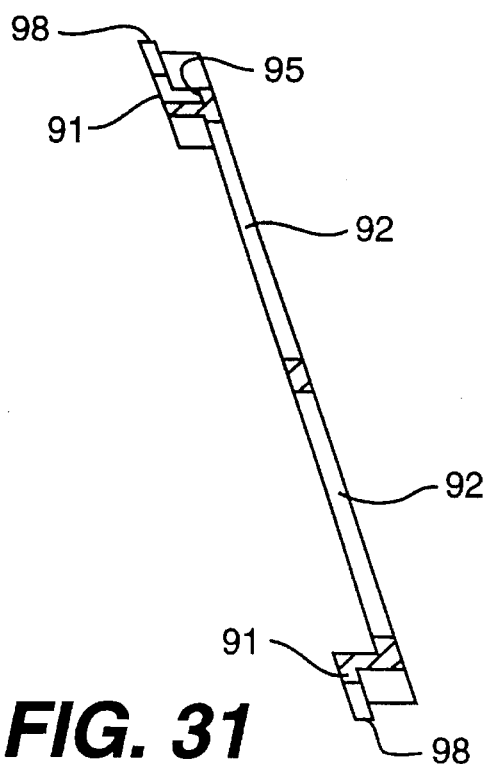
FIG. 31 is a cross sectional view of the filter frame shown in FIG. 28 taken along lines 31—31 thereof.
Figure 32:
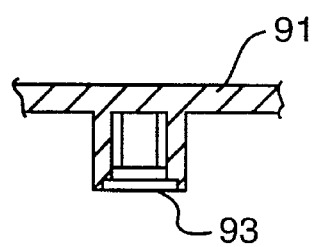
FIG. 32 is a cross sectional view of a portion of the filter frame shown in FIG. 27 taken along lines 32—32.

Side filter frames 90, which are used for side walls 20 and 30, according to a preferred embodiment, have a peripheral frame portion 91. Cross supports 97 and diagonal supports 92 extend to form a lattice structure within the peripheral frame portion 91 that holds the filter material in contact with the arrays of holes 21. The filter frame 90 has sockets 93 that align with posts 31 formed in the side wall recesses 22, as shown in FIG. 8, for example. A detailed view of sockets 93 is shown in FIG. 32. The sockets are open at only one end, the end in which a post 31 is received, so that no air flow passage is created by the engagement of the sockets to the post. Along the rim 23 of recesses 22, formed in the side walls of the container, are shoulders 32 that are provided to secure the peripheral frame portions 95, which are formed in cut-out portions 94 of the filter frame periphery 91. In a preferred embodiment, as shown in FIG. 26, ten such cut-out portions 94 are provided that together with the socket and post securing structure provide secure engagement of the filter frame 90 within the respective recesses 22. For additional structural support, the sockets are formed with socket bases 98, as shown in FIGS. 27 and 29–31, that extend slightly outside the remainder of the peripheral frame portion 91. Also, small protrusions 96 are provided along the underneath side of the filter frame 90, as shown in FIGS. 27 and 30, to provide additional discreet points of engagement of the filter frame with the filter material.

Figure 36:
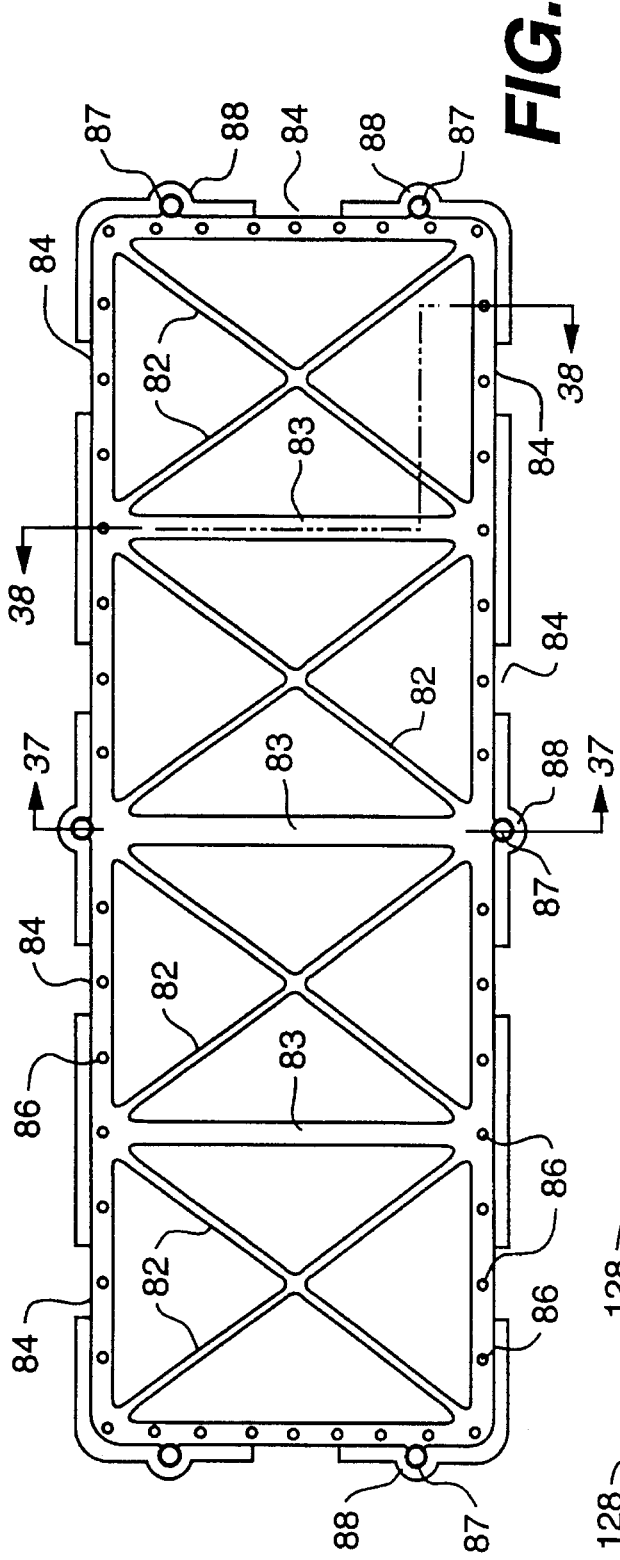
FIG. 36 is a plan view of the filter frame opposite to the view shown in FIG. 33.

Whereas the peripheral frame portion 91 of filter frames 90 is generally trapezoidal in shape, according to a preferred embodiment thereof, filter frames 80 for the lid 60 are substantially rectangular and have socket bases 88 that extend outside the peripheral contour of the frame, as shown in FIGS. 33 and 36. Filter frame 80 is also provided with cross member frame portions 83 and diagonal frame portions 82. About the periphery of the frame are ten cut-out portions 84 with edge portions 85, as shown in FIGS. 34, 35 and 38, in particular, that snap into locking engagement with corresponding shoulder flange structure 66 provided in the lid, as shown in FIG. 13, for example. The sockets 87, as shown in FIGS. 36 and 37, engage posts 67 formed in the lid, as also shown in FIG. 13. By providing the socket and post construction, as well as the engagement of edge portions 85 with the shoulder flanges 67, the lid filter frames can be secured within the recesses 64 of the lid, as shown in FIG. 2, thereby retaining filter material, not shown, in place and covering the arrays of holes 65.

Although the present invention has been disclosed with respect to a preferred embodiment thereof presented in the figures, modifications can be made to the embodiment that is shown. Further, although the disclosure includes many figures that are not required to be drawn to scale, the figures set forth in the foregoing disclosure of the preferred embodiment of the invention are drawn to scale with relation to each other and a direct comparison between the figures can be used to further understand the disclosure of the preferred embodiment, as readily apparent to one having ordinary skill in the art.

We claim:

1. An animal tote comprising:

a unitary injection molded plastic container having a bottom wall, opposed side walls and opposed end walls with an open top;

a lid for covering the open top of said container, said lid having a substantially planar mid portion and a peripheral flange that engages a rim of said container for securing said lid to said container;

airflow passages formed in said lid and at least of one said side and end walls, said airflow passages including an array of minute holes; and an air filter material holding means disposed adjacent said airflow passages for holding a filter material in contact with said array of minute holes for filtering airflow into an interior of said container through said airflow passages.

2. An animal tote according to claim 1, wherein said array of minute holes is recessed within said planar portion of said lid and within a planar portion of said at least one of said side and end walls, and wherein said filter material holding means retains a sheet filter material within said recess planar portions, respectively.

3. An animal tote according to claim 1, wherein said filter material holding means includes a snap-on grid for holding a sheet filter material in contact with said array of minute holes, said snap-on grid having posts that snap into apertures formed in said lid and said at least one of said side and end walls.

4. An animal tote according to claim 1, wherein said lid has stacking posts on which one said bottom wall of an adjacent stack container rests when a plurality of said animal totes are stacked in a vertical stack.

5. An animal tote according to claim 4, wherein said stacking posts include upright corner flanges for receiving corner portions of an adjacent one of said animal totes when stacked in a vertical stack.

6. An animal tote according to claim 4, wherein said stacking posts have an upper surface spaced above said planar portion of said lid for separating one said bottom wall of an adjacent stack container from said planar portion of said lid for permitting airflow between adjacent ones of said lid and said bottom wall when said animal totes are stacked in a vertical stack.

7. An animal tote according to claim 1, wherein said container has a rim flange engaged by said peripheral flange of said lid when said lid is secured to said container, said lid flange and said container flange forming a tortuous airflow passage for preventing the direct flow of air into said container between said lid and said container.

8. An animal tote according to claim 7, wherein said lid flange and said container flange have mating side faces forming a face portion extending around a periphery of said animal tote that receives an adhesive tape for extending across a joint formed between said mated side faces.

9. An animal tote according to claim 1, wherein said side and end walls each have said airflow passages and said filter material holding means for covering said respective ones of said arrays of minute holes.

10. An animal tote according to claim 1, wherein said side and end walls are tapered inwardly from said container flange to said bottom wall for providing separation between respectively adjacent ones of said side and end walls when a plurality of said animal totes are placed side by side to provide airflow circulation between side by side ones of said animal totes.

11. An animal tote according to claim 1, further comprising dividers for dividing an interior of said container into separate compartments for containing individual animals, said side and end walls having means for securing said dividers along an interior face of said side and end walls.

12. An animal tote according to claim 1, further comprising at least one water dispenser and at least one of said side and end walls having means for receiving said at least one water dispenser.

\* \* \* \* \*